United States Patent
Crichton (10) Patent No.: US 7,260,784 B2
(45) Date of Patent: Aug. 21, 2007

(54) DISPLAY DATA MAPPING METHOD, SYSTEM, AND PROGRAM PRODUCT

(75) Inventor: Joseph M. Crichton, Poughkeepsie, NY (US)

(73) Assignee: International Business Machines Corporation, Armonk, NY (US)

(*) Notice: Subject to any disclaimer, the term of this patent is extended or adjusted under 35 U.S.C. 154(b) by 76 days.

(21) Appl. No.: 10/249,781

(22) Filed: May 7, 2003

(65) Prior Publication Data

US 2004/0239701 A1 Dec. 2, 2004

(51) Int. Cl.
*G06F 3/00* (2006.01)

(52) U.S. Cl. .............. 715/751; 715/750; 715/853; 715/783; 715/804

(58) Field of Classification Search .......... 345/750, 345/751, 781, 783, 733, 804, 803
See application file for complete search history.

(56) References Cited

U.S. PATENT DOCUMENTS

| | | | |
|---|---|---|---|
| 5,008,853 A | | 4/1991 | Bly et al. |
| 5,596,702 A | * | 1/1997 | Stucka et al. ............... 715/746 |
| 5,844,553 A | * | 12/1998 | Hao et al. ................... 345/733 |
| 5,877,762 A | * | 3/1999 | Young ......................... 715/803 |
| 6,119,104 A | | 9/2000 | Brumbelow et al. |
| 6,151,020 A | | 11/2000 | Palmer et al. |
| 6,151,622 A | * | 11/2000 | Fraenkel et al. ............ 709/205 |
| 6,204,847 B1 | * | 3/2001 | Wright ........................ 345/804 |
| 6,389,437 B2 | * | 5/2002 | Stoub ........................... 715/523 |
| 6,911,987 B1 | * | 6/2005 | Mairs et al. ................ 345/557 |
| 2002/0138624 A1 | * | 9/2002 | Esenther ..................... 709/227 |

OTHER PUBLICATIONS

Balbach, Lisa, "Microsoft Net Meeting", http://www.kirtland.cc.mi.us/cis/NetMeeting/NetMeeting.htm, Jul. 31, 2002, pp. 1-19.
Wilbur, Sylvia B., "Dimensions of Sharing in Multimedia Desktop Conferencing", IEE Colloquium on "CSCW: Computer Supported Co-Operative Work", Oct. 24, 1990, Digest No. 1990/137, 5 pages.
Palmer et al., "Shared Desktop: A Collaborative Tool for Sharing 3-D Applications among Different Window Systems", http://research.compaq.com/wrl/DECarchives/DTJ/DTJRO3/DTJR..., Jul. 30, 2002, pp. 1-12.
Jung et al., "Window Capturing-Based Application Sharing under Heterogeneous Window Systems", Computer & Graphics, vol. 22, No. 2-3, Mar./Jun. 1998, pp. 243-254.

* cited by examiner

*Primary Examiner*—Kristine Kincaid
*Assistant Examiner*—Ryan Pitaro
(74) *Attorney, Agent, or Firm*—Jay H. Anderson; Hoffman, Warnick & D'Alessandro (57) ABSTRACT

A method, system, and program product are provided in which display data for a display area that includes at least one window is mapped to a shared format. Attribute information for each window in the display area is determined and stored in a unique node. A hierarchy of nodes is generated using the attribute information. For each pixel in the display area, the corresponding node is determined. Using the attribute information in the node, the display data is mapped to a shared format. The mapped display data can then be shared with one or more other systems.

19 Claims, 8 Drawing Sheets

DISPLAY DATA MAPPING METHOD, SYSTEM, AND PROGRAM PRODUCT

BACKGROUND OF INVENTION

This invention generally relates to mapping display data, and more particularly to mapping display data from one or more formats to a shared format.

Collaboration between individuals takes on many forms with face-to-face, telephone calls and e-mails being some of the most ubiquitous. As technology has progressed, individuals have sought to further collaborate by sharing video, voice, whiteboard markup, chat, as well as computer applications. Two common collaboration software products that allow such sharing are Lotus SAMETIME® and Microsoft NETMEETING®. One problem with many current collaboration software products is their platform dependency. For example, Microsoft NETMEETING® only works on systems that use a version of the Microsoft WINDOWS® operating system. Different platforms manage display data differently. This presents a significant obstacle to creating collaboration products that can be used across platforms.

For example, display data includes pixel data for each pixel in the display. Pixel data includes information on the location of the pixel, the color of the pixel, and the depth of the pixel. Various formats are used to represent color information in pixel data. Consequently, to implement the sharing of display data across platforms, pixel data can be converted into a shared format. However, several factors prevent many implementations from efficiently converting pixel data into a shared format. One factor is the need to determine the window that "owns" each pixel in the display area to be converted. A window owns a pixel when it provides pixel data for the pixel.

In a typical windows display environment, windows can have a hierarchical relationship. For example, a parent window can be created that includes within its display space one or more child windows. Child windows can also have one or more child windows of their own. Each window occupies a portion of any ancestor window's (i.e., parent window, grandparent window, etc.) display space. Sibling windows either share the same parent window or have no parent window (i.e., they are displayed on the desktop). Sibling windows are assigned a stacking order. The stacking order determines the order in which sibling windows are drawn, and as a result, which sibling window is "on top" when the display areas for two sibling windows overlap. The size, stacking order, and number of windows are frequently changed by a user. For example, a parent window might be "maximized" to take up an entire display area. Further, a user can select a window partially behind a sibling window, resulting in the selected window being shown on top of the sibling window.

Determining pixel ownership is important, for example, in an X Windows System, since pixel data can be formatted differently for each window in this system. The X Window System is a client-server windowing system in which an "X client" (application) performs processing that includes commands to alter a display. These commands are provided to an "X server" that implements the display alteration (i.e., "serves" the image to a user). The X server resides on the computer with the display, while the X client can reside on any computer in a computer network that includes the computer with the display.

Typical display formats vary by "depth," i.e., the number of bits used for the pixel data for each pixel, and "visual," i.e., how the pixel data is to be interpreted. Depth determines the number of possible colors that can be displayed at one time for pixels within a window. For example, pixel data having a depth of eight bits allows up to two hundred fifty-six ($2^8$) colors to be displayed simultaneously. In general, the visual determines whether the pixel data is to be interpreted as including the color values or as including one or more indexes into color table(s) that contain the color values. There are six standard types of visuals in an X Window System environment: TrueColor pixel data includes the Red-Green-Blue (RGB) color values encoded in the pixel data, StaticColor and StaticGray pixel data contain an index into a color table containing unchangeable color values, DirectColor pixel data includes three separate index values to look up the RGB color values in three separate modifiable color tables, and GrayScale and PseudoColor pixel data comprise an index into a modifiable color table that contains the color values. The final three visuals allow the values in the one or more color tables to be modified, thereby allowing the actual color displayed for a particular value to be variable. A twenty-four bit TrueColor format is a commonly used format for display data. With this format, the actual value for each color (i.e., Red, Green, and Blue) is represented by a unique eight bit portion of the twenty-four bit value. Numerous systems and applications are configured to support this format. For example, the JAVA® programming language developed by Sun Microsystems supports the twenty-four bit TrueColor format and has been implemented on numerous systems and platforms.

Determining when an area of the display has been modified is another factor that prevents efficiently converting display data. For example, an X server provides a display-based event stream and query mechanism to inform an application of a user-initiated event, thereby allowing the application to interact with the user. An application can specify which events it desires to be notified about, and take appropriate action based on the event. Common events include creating/destroying a window, resizing a window, changing the stacking order of a window, etc. However, an X server does not provide an event that signals when an area of a display has been modified. Consequently, in order to share a display area with another system, display data for the entire display area must be continually copied and monitored.

Several approaches have been provided to implement application sharing including sharing display data in an X Windows System. For example, a separate viewer program can be executed. This approach is used in the Virtual Network Computing (VNC) solution provided by AT&T Laboratories. Alternatively, the communications between multiple X clients and X servers can be multiplexed. This approach is used in the XMX solution developed by Brown University. However, both these approaches require the application to be started inside the X server in order to share the application. This means that a user needs to recognize a desire to share or remotely access an application before it is launched. This limitation can degrade productivity when an application cannot be readily restarted. Another approach for application sharing is to add functional extensions to the X server. However, the use of extensions severely limits the number of platforms on which this approach can be readily implemented. Categorizing and mapping each pixel is another performance problem for XWindows based sharing approaches that seek to share display data using external functions (i.e., no proxies, just standard X11 protocol) when the various windows within the shared display area may use different display formats to represent the display data. External approaches that attempt to address the use of different display formats fail to provide an efficient solution for mapping pixel data that takes advantage of the hierarchical relationship of windows.

As a result, there exists a need for a way to efficiently map display data for a display area in which multiple windows are present and more than one display format is used to represent the display data.

SUMMARY OF INVENTION

The invention provides a display data mapping method, system, and program product. A hierarchy of nodes is generated that represents various windows and their respective attribute information relevant to the display area being mapped. Display data for the display area is obtained and efficiently mapped using the hierarchy of nodes. The mapped display data can then be used, for example, to implement collaboration between users at multiple systems. For example, an X Windows application can be shared without the need to modify where the application is run or the X server software. Further, the invention can allow a system to share display data with different types of systems (i.e., X Windows and Microsoft WINDOWS®).

A first aspect of the invention provides a method of mapping display data for a display area including at least one window, the method comprising: creating a node for each window, each node including hierarchical relationship data; generating a hierarchy of nodes based on the hierarchical relationship data; and mapping the display data from a first format to a shared format using the hierarchy of nodes.

A second aspect of the invention provides a system for sharing display data for a shared display area including at least one window, the system comprising: means for creating a node for each window; means for managing a hierarchy of nodes that includes each node; means for mapping the display data to a shared format using the hierarchy of nodes; and means for sharing the mapped display data with a destination computer.

A third aspect of the invention provides a system for mapping display data for a shared display area including at least one window, the system comprising: means for creating a node for each window; means for managing a hierarchy of nodes that includes each node; and means for mapping the display data to a shared format using the hierarchy of nodes.

A fourth aspect of the invention provides a computer program product comprising a computer useable medium having computer readable program code embodied therein for mapping display data for a display area including at least one window, the program product comprising: program code configured to create a node for each window, the node including attribute information; program code configured to manage a hierarchy of nodes that includes each node; and program code configured to map the display data to a shared format using the hierarchy of nodes.

A fifth aspect of the invention provides a computer-readable storage medium having stored therein instructions for performing a method, the method comprising the steps of: creating a node for each window, each node including hierarchical relationship data; generating a hierarchy of nodes based on the hierarchical relationship data; and mapping the display data from a first format to a shared format using the hierarchy of nodes.

The illustrative aspects of the present invention are designed to solve the problems herein described and other problems not discussed, which are discoverable by a skilled artisan.

BRIEF DESCRIPTION OF DRAWINGS

These and other features of this invention will be more readily understood from the following detailed description of the various aspects of the invention taken in conjunction with the accompanying drawings in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION

The invention provides a display data mapping method, system, and program product. A hierarchy of nodes is generated that represents various windows and their respective attribute information relevant to a display area being mapped. Display data for the display area is obtained and efficiently mapped using the hierarchy of nodes. The mapped display data can then be used, for example, to allow display data to be shared between users at multiple systems as part of a collaboration system. While the description below describes the invention implemented as part of a collaboration system, it is understood that the collaboration system is only illustrative of the various systems in which this invention can be implemented.

For convenience purposes only, the remaining description includes three sections denoted by the headings I. ENVIRONMENT, II. COLLABORATION SYSTEM OVERVIEW, III. MAPPING METHOD, and IV. MISCELLANEOUS.

I. Environment

Figure 1:
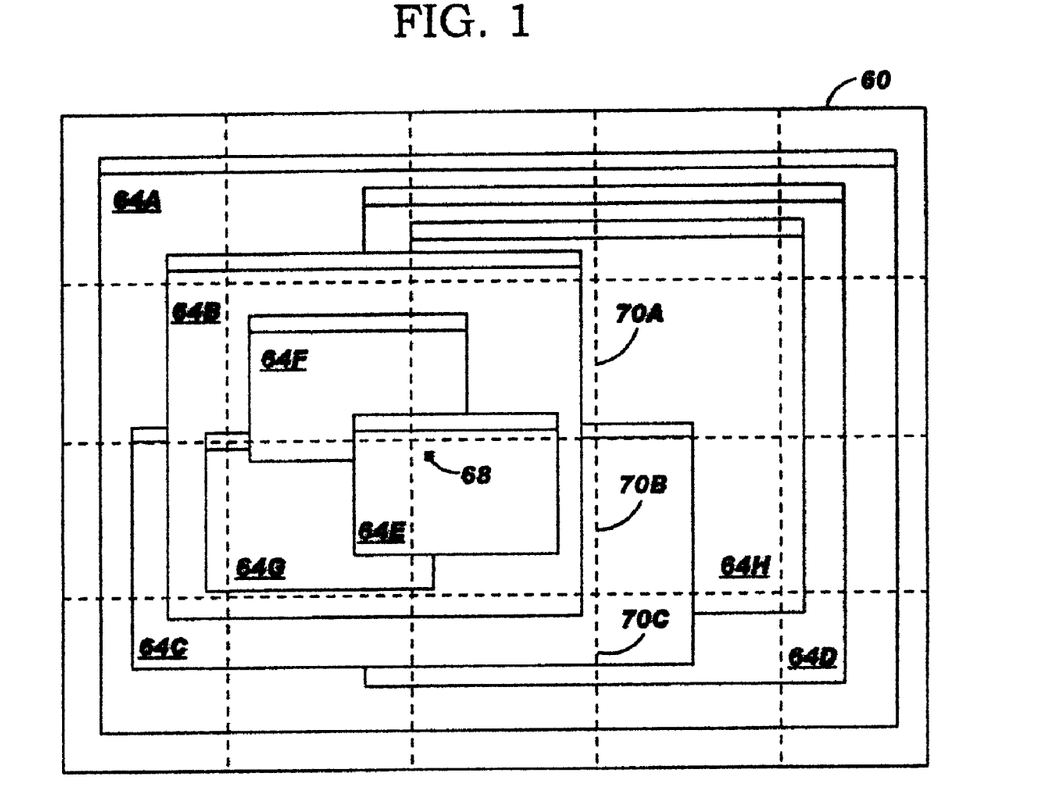
FIG. 1 shows a view of an illustrative shared display.

FIG. 1 shows an illustrative display area 60. Display area 60 can be defined using any method now known or later developed. For example, display area 60 may be defined by an application, by an area defined by one or more windows, by an area comprising a portion or all of a display area of a display (i.e., the screen area of a monitor), and/or by multiple disjoint areas of a display.

Windows 64A-H in display area 60 can be related or have no relationship to one another. For example, each window 64A-H can display data for a unique application, and therefore have no relationship with any other window 64A-H. Alternatively, some or all of windows 64A-H can have a hierarchical relationship with one another. In a window hierarchy, a window limited to the display area of another window is a "child window" of the other "parent window." A window hierarchy can have any number of levels, resulting in a "grandchild window" having a "grandparent window," a "great-grandchild window" having a "great-grandparent window," etc. Windows that either share the same parent window or have no parent window (i.e., they are displayed on the desktop) are "sibling windows." It is understood that relationships between windows 64A-H are discussed from the view point of an application. As a result, any alterations or modifications to the hierarchy that may be made by an operating system in rendering the windows are not addressed in this discussion. For example, in an X Windows system, the window manager may reparent top-level application windows providing window manager decorations that allow for window resizing, movement, etc.

For purposes of description, it is assumed that any window 64A-H that is displayed completely within another window 64A-H is either a child or grandchild of that window. As a result, windows 64B-D are child windows of window 64A, windows 64E-G are child windows of window 64B and grandchildren of window 64A, and window 64H is a child window of window 64D and grandchild of window 64A. Consequently, window 64A, windows 64B-D, windows 64E-G, and window 64H constitute four distinct sets of sibling windows. It is understood that numerous other relationships between windows 64A-H are possible, and the teachings of the invention apply equally to these other relationships.

A stacking order is assigned to windows 64A-H to determine how the overlapping regions of windows 64A-H are displayed. The stacking order is partially determined by the hierarchical relationship of the windows. For example, a child window is displayed on top of a parent window. Consequently, windows 64B-D are each displayed on top of their parent window 64A. Within a set of sibling windows, the stacking order is further determined by the order that the windows were created, selected by a user, updated, etc. As shown, within the set of sibling windows 64B-D, window 64B is displayed on top of window 64C that is displayed on top of window 64D. Consequently, window 64B is at the top of the stacking order for the set of sibling windows, followed by window 64C, and then window 64D. Similarly, within the set of sibling windows 64E-G, window 64E is at the top of the stacking order, followed by window 64F, and then window 64G.

II. Collaboration System Overview

Figure 2:
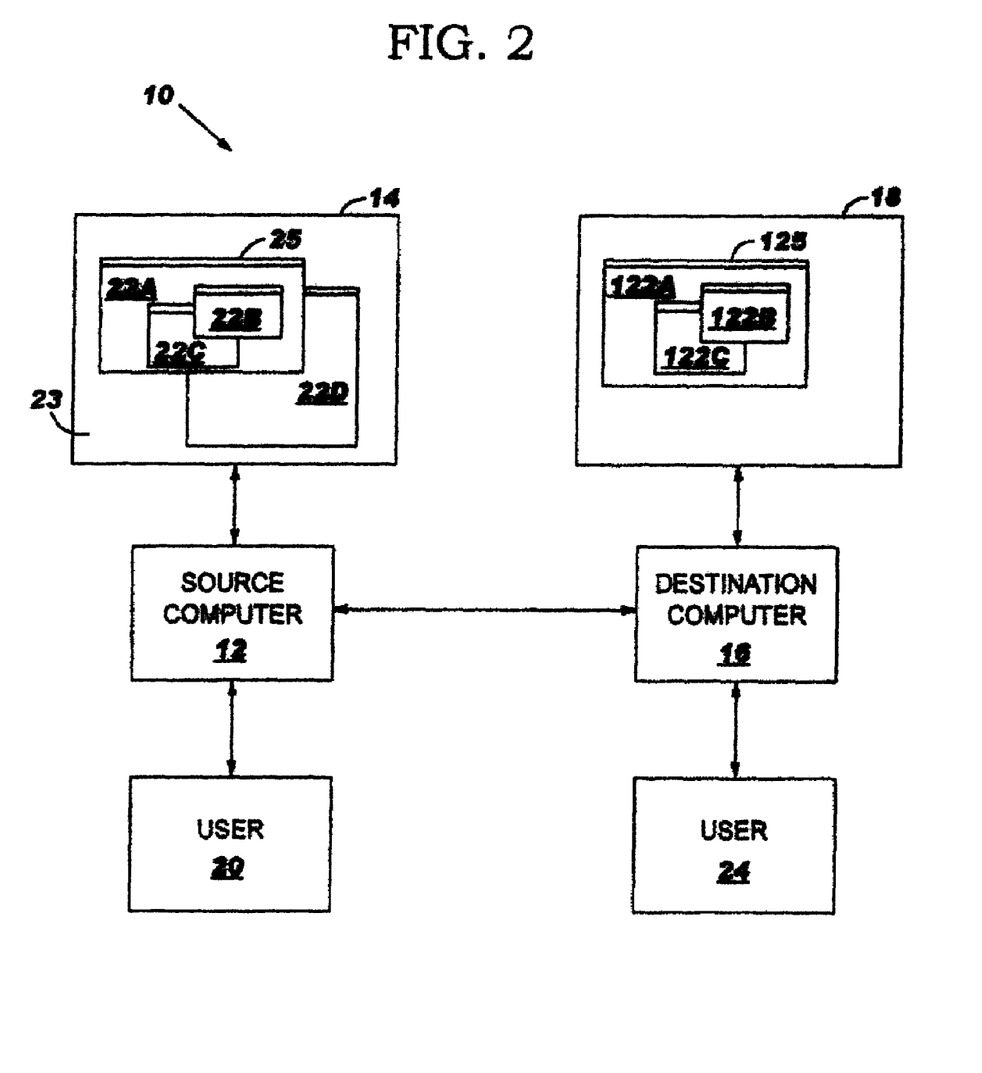
FIG. 2 shows a block diagram of an illustrative system for collaborating between multiple computers.

As discussed previously, mapping display data is commonly implemented as part of a collaboration system so that display data can be shared. FIG. 2 shows a block diagram of an illustrative system 10 for collaborating using multiple computers 12, 16. System 10 includes a source computer 12 having a source display 14 and a destination computer 16 having a destination display 18. It is understood that while only two computers 12, 16 are shown and discussed, the teachings of the invention apply to collaboration systems implemented using any number of computers. Typically, user 20 interacts with source computer 12 using one or more I/O devices that include source display 14. Source computer 12 can include a windows-based display system that displays data for one or more applications in windows 22A-D on source display 14. Further, source computer 12 and/or destination computer 16 include one or more systems for sharing display data for source display 14 with destination display 18.

Source display 14 includes a display area 23. A shared display area 25 can be defined within display area 23 using any method, including for example, by an application executing on source computer 12, one or more windows 22A-D displayed on source display 14, and/or an area comprising a portion of or all of display area 25 of source display 14. In this example, shared display area 25 is defined as the portion of display area 23 having windows 22A-C. Shared display area 25 is shared with destination computer 16 for display on destination display 18 as destination display area 125. Window 22D is not shared with destination computer 16. User 24 can view destination display area 125 on destination display 18 as windows 122A-C. User 24 can also be allowed to interact with destination computer 16 to alter the display data for shared display area 25 which is subsequently displayed in destination display area 125.

Figure 3:
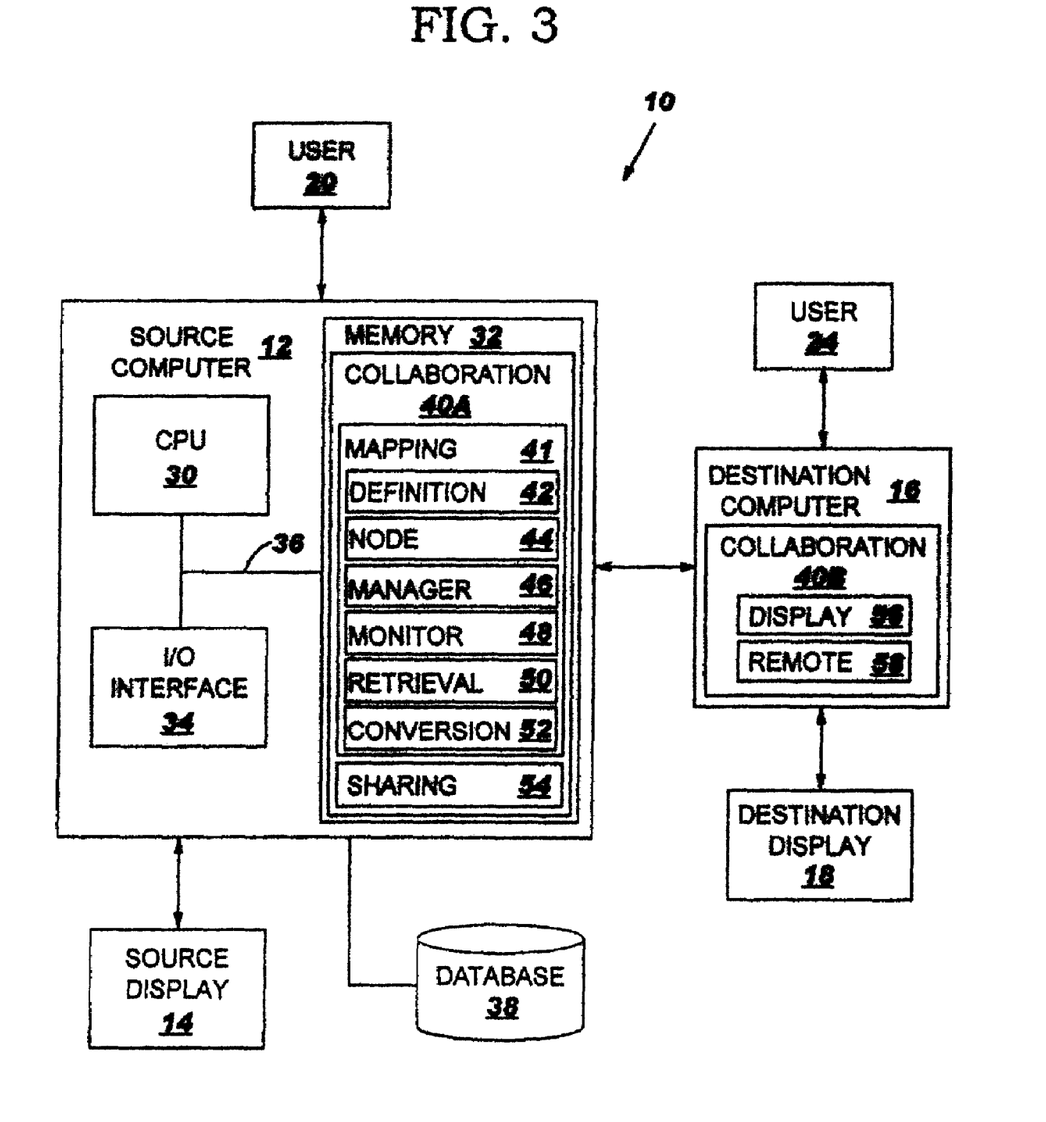
FIG. 3 shows a more detailed block diagram of the system of FIG. 2.

FIG. 3 shows a more detailed block diagram of system 10. Source computer 12 is shown including a central processing unit (CPU) 30, memory 32, input/output (I/O) interface 34, bus 36, and an optional database 38. Destination computer 16 is shown in communication with source computer 12. Communications between source computer 12 and destination computer 16 may be any now known or later developed mechanisms for such purposes, e.g., one or more direct hardwired connections (e.g., serial port), or via an addressable connection in a client-server (or server-server) environment which may utilize any combination of wireline and/or wireless transmission methods. In a client-server environment, the server and client may be connected via the Internet, a wide area network (WAN), a local area network (LAN), a virtual private network (VPN), or other private network. The server and client may utilize conventional network connectivity, such as Token Ring, Ethernet, WiFi or other conventional communications standards. Where the client communicates with the server via the Internet, connectivity could be provided by conventional TCP/IP sockets-based protocol. In this instance, the client would utilize an Internet service provider to establish connectivity to the server.

Source computer 12 and destination computer 16 can comprise any general purpose or specific-use system utilizing standard operating system software, which is designed to drive the operation of the particular hardware and which is compatible with other system components and I/O controllers. CPU 30 may comprise a single processing unit, multiple processing units capable of parallel operation, or be distributed across one or more processing units in one or more locations, e.g., on a client and server. Memory 32 may comprise any known type of data storage and/or transmission media, including magnetic media, optical media, random access memory (RAM), read-only memory (ROM), a data cache, a data object, etc. Moreover, similar to CPU 30, memory 32 may reside at a single physical location, comprising one or more types of data storage, or be distributed across a plurality of physical systems in various forms.

As shown, user 20, source display 14, and destination computer 16 interact with source computer 12 via I/O interface 34. I/O interface 34 may comprise any system for exchanging information with user 20, source display 14, and/or destination computer 16 including, for example, an I/O port (serial, parallel, ethernet, keyboard, mouse, etc.), a universal serial bus (USB) port, expansion bus, integrated drive electronics (IDE), a network system, a modem, speakers, a monitor (cathode-ray tube (CRT), liquid-crystal display (LCD), etc.), hand-held device, keyboard, mouse, voice recognition system, speech output system, scanner, printer, facsimile, pager, storage devices, etc. Bus 36 provides a communication link between each of the components in source computer 12 and likewise may comprise any known type of transmission link, including electrical, optical, wireless, etc. In addition, although not shown, additional components, such as cache memory, communication systems, system software, etc., may be incorporated into source computer 12.

Database 38 may provide storage for information necessary to carry out the invention as described herein. As such, database 38 may include one or more storage devices, such as a magnetic disk drive or an optical disk drive. Further, database 38 can include data distributed across, for example, a LAN, WAN or a storage area network (SAN) (not shown). Database 38 may also be configured in such a way that one of ordinary skill in the art may interpret it to include one or more storage devices. It is understood that destination computer 16 also includes the various hardware components shown and discussed in conjunction with source computer 12. These components have not been separately depicted or discussed for brevity purposes.

To implement the various functions of collaboration system 10, source computer 12 includes collaboration program 40A stored in memory 32 as computer program code, and destination computer 16 includes collaboration program 40B stored as computer program code. Collaboration program 40A includes a mapping system 41 and a sharing system 54. As will be discussed further below, mapping system 41 maps display data for shared display area 25 (FIG. 2) from a first format into a shared format. Sharing system 54 stores the mapped display data as shared display data that is subsequently provided to collaboration program 40B on destination computer 16. Mapping system 41 can update the shared display data and sharing system 54 can share the shared display data periodically, on demand, or some combination thereof.

Collaboration program 40B includes display system 56 that is configured to display the shared display data in destination display area 125 (FIG. 2) on destination display 18. When displaying the shared display data, display system 56 can determine if any of the shared display data has been modified, and update the portions of destination display area 125 that have been modified. The determination can be made, for example, by dividing the display data into sections, and comparing one section at a time. Sharing system 54 can monitor the frequency that the shared display data is being used by destination computer 16, and adjust the rate at which mapping system 41 maps the display data based on the monitored frequency. In this case, a maximum time period can be set beyond which the shared display data is refreshed with newly mapped display data. Collaboration program 40B also includes remote system 58 that allows user 24 to alter the display data for shared display area 25 using destination computer 16. To implement alteration by user 24, remote system 58 collects input device events (e.g., keyboard, mouse, etc.) generated at destination computer 16 and forwards these events to sharing system 54 on source computer 12. Sharing system 54 places the events into the event stream of source computer 12 so that they are processed as if they were generated by an input device located at source computer 12.

Mapping system 41 maps display data for shared display area 25 (FIG. 2) into shared display data used by sharing system 54. In particular, mapping system 41 maps the pixel data included in the display data for each pixel in display area 25 from a first format into a shared format. Mapping system 41 includes a definition system 42, a node system 44, a manager system 46, a monitor system 48, a retrieval system 50, and a conversion system 52. The operation of these systems will be described below relative to the mapping method of the invention.

It is understood that additional/less functionality may be included in collaboration system 10. For example, remote system 58 allows user 24 to alter the display data for shared display area 25 using destination computer 16, an optional feature of collaboration system 10. Further, user 20 and/or user 24 can allowed to select the extent of collaboration implemented between systems. A keystroke sequence can be used to specify that no collaboration, shared display only, shared display and audio, remote control, etc. is to occur. Still further, the location of a mouse pointer in a display (source display 14 and/or destination display 18) can be shared between source computer 12 and destination computer 16 using sharing system 54 and/or remote system 58.

III. Mapping Method

The invention maps display data for a display area into a shared format. In one embodiment, the display data includes pixel data for each pixel in the display area. Pixel data includes information on the location of the pixel, the color of the pixel, and the depth of the pixel. The pixel data is mapped from a first format into a shared format. The method of the invention is discussed with reference to FIGS. 3 and 4, which respectively show an illustrative mapping system 41 and an overview of the method steps used in performing the mapping according to one embodiment of the invention. In step S1 (FIG. 4), a display area 25 (FIG. 2) to be mapped is defined by definition system 42 (FIG. 3).

Figure 6:
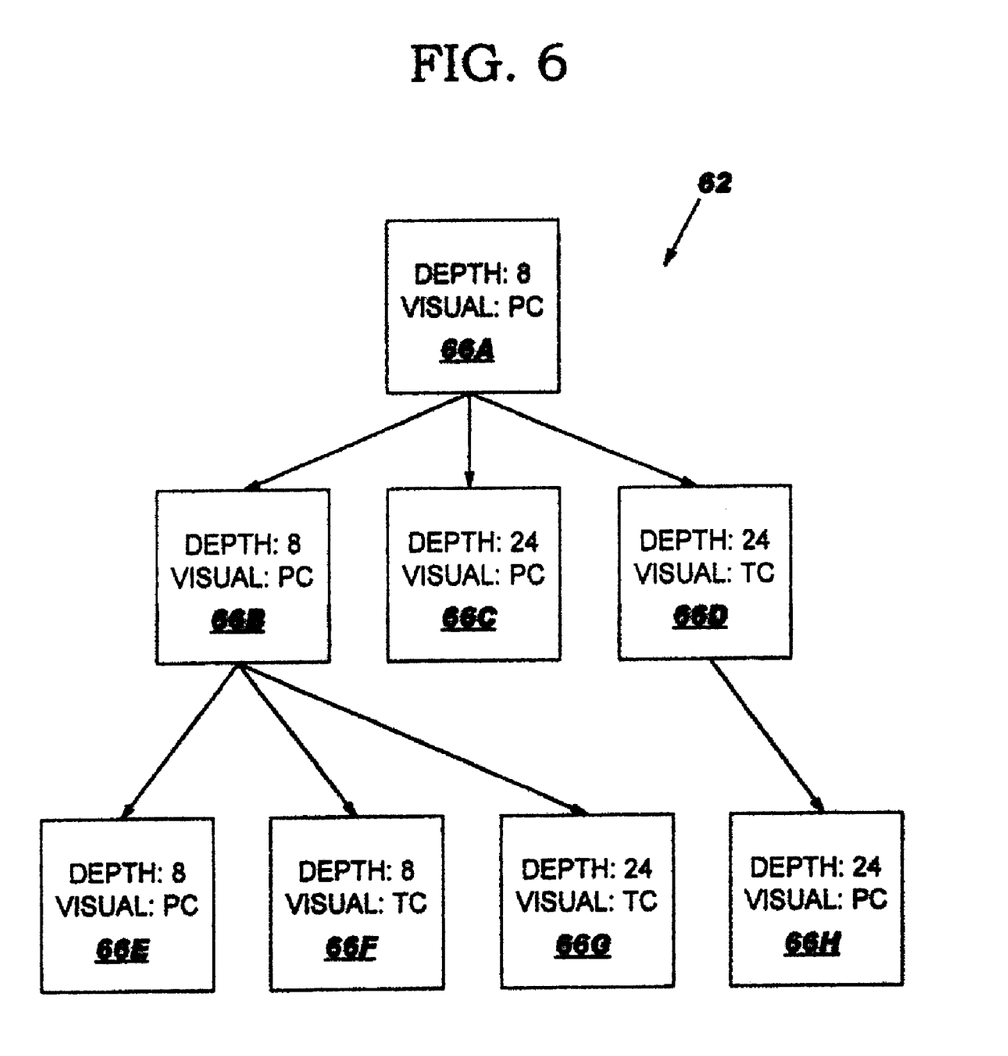
FIG. 6 shows a schematic representation of a hierarchy of nodes based on the shared display in FIG. 1.

In step S2 (FIG. 4), a node is created for each window that is relevant to display area 25 by node system 44 (FIG. 3). In one embodiment, a node is created for each window displayed on source display 14 (i.e., windows 22A-D in FIG. 2). Including all windows allows the location of a window that is not shared (i.e., window 22D) to be monitored to determine if it is subsequently moved into a shared area or overlaps a shared window. However, it is understood that nodes may only be created for a portion of the windows (e.g., all windows within a certain area of source display 14 or all windows designated as being shared). FIG. 6 depicts a schematic representation of a hierarchy of nodes 62 for display area 60 of FIG. 1 that includes nodes 66A-H. Each node 66A-H is a collection of data that includes attribute information for its corresponding window 64A-H (FIG. 1). The "attribute information" includes hierarchical relationship data (i.e., data on a parent window and/or child window(s)), as well as the size, location, and/or shape of the corresponding window. In addition, data for the format of the pixel data for the window is stored as attribute information. In the illustrative embodiment, the format data includes a depth and visual for the pixel data as shown in FIG. 6. Additionally, a color map may be created and stored as attribute information for a node that corresponds to a window using indexed pixel values. Often, windows in an application share a single color map. Consequently, one color map can be created and shared by all the nodes corresponding to windows that share the color map. For dynamic visual types, the color map may need to be updated based on the occurrence of a window event indicating that the color map instance has been changed and/or on a periodic basis to determine whether any values in the color map have been modified. For example, for a dynamic color map, the values in the color map can be reread every time the display area is to be remapped. It is understood that more or less information can be stored as attribute information. For example, stacking order data, clipping information (i.e., the amount of a window visible within its parent), and/or a border size can be included for each window.

Figure 4:
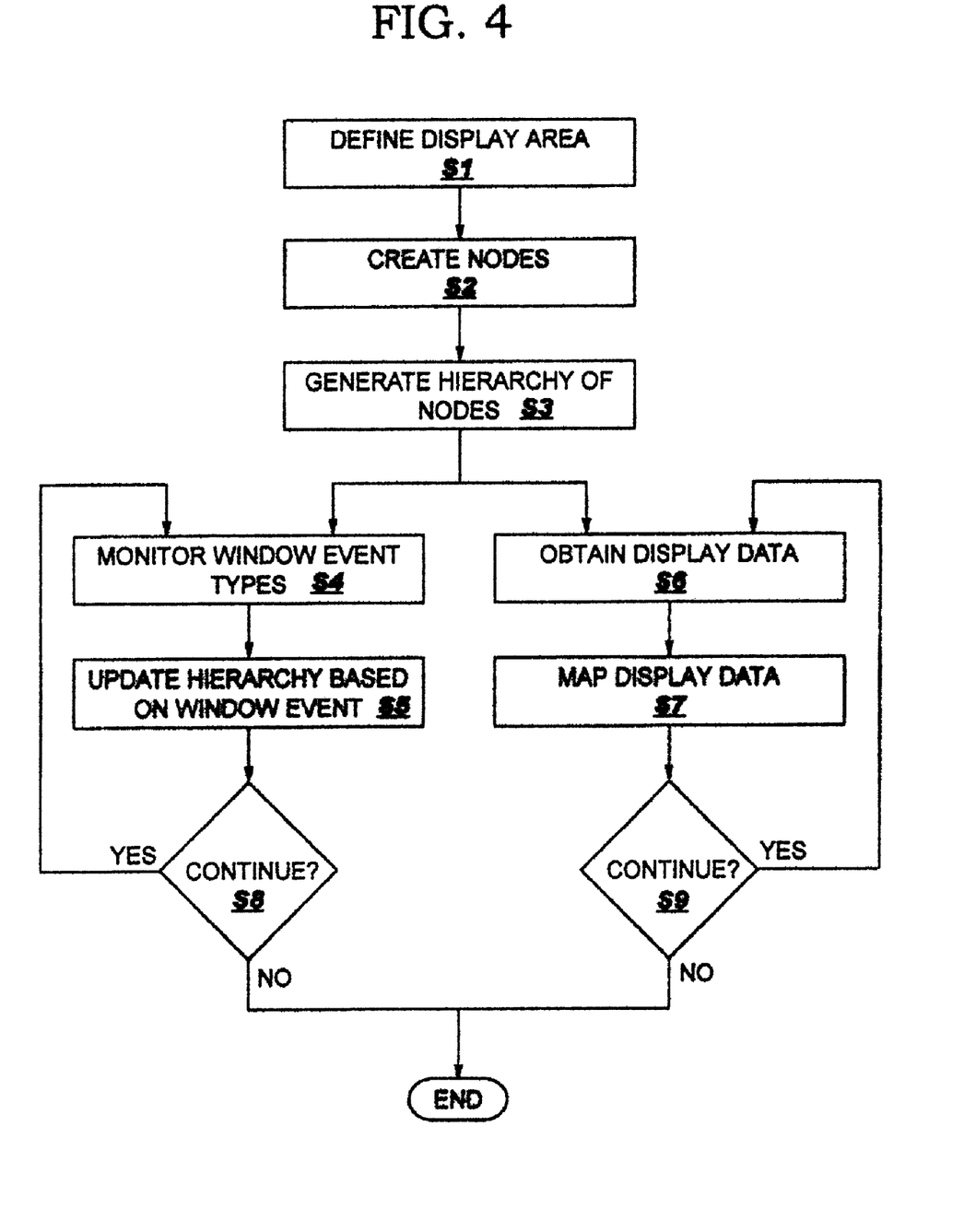
FIG. 4 shows a method according to one embodiment of the invention.
Figure 7:
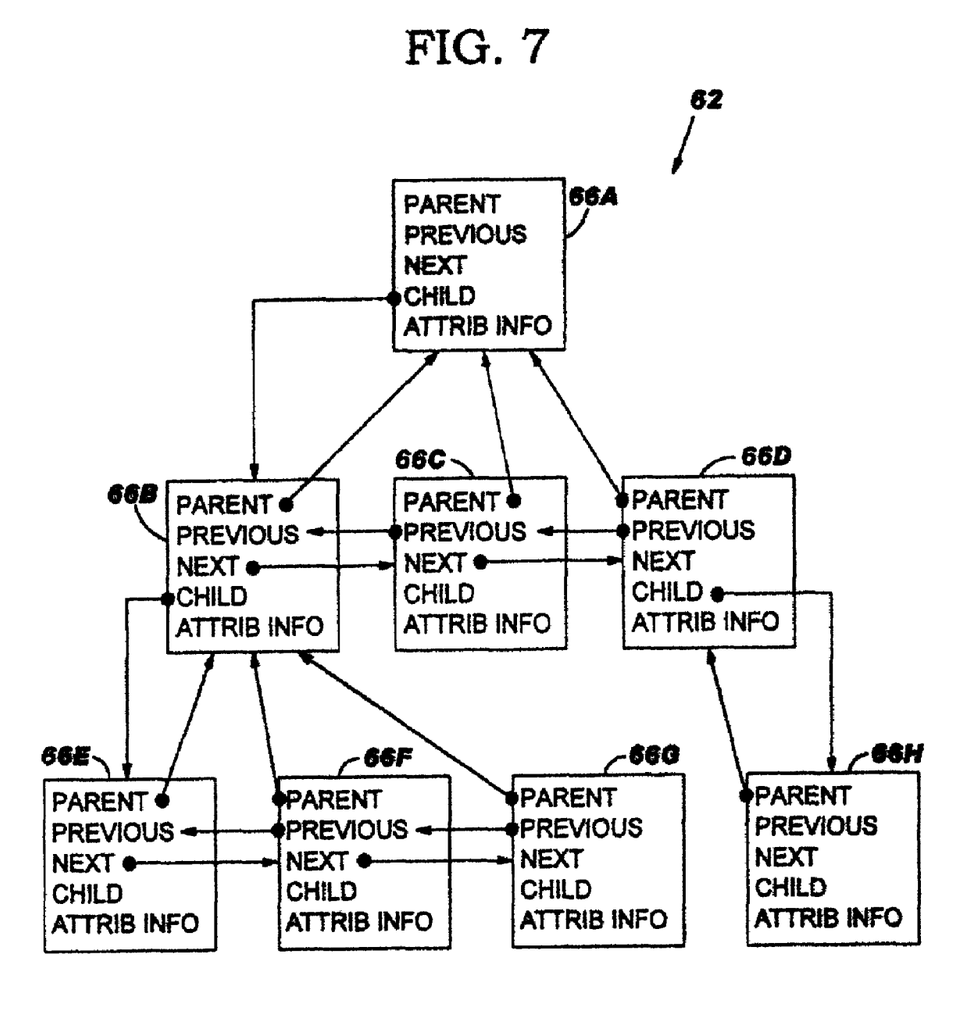
FIG. 7 shows an alternative schematic representation of the illustrative hierarchy of nodes in FIG. 6.

In step S3 of FIG. 4, hierarchy of nodes 62 (FIG. 6) is generated using hierarchical relationship data and/or stacking order data stored as part of the attribute information of each node 66A-H by manager system 46 (FIG. 3). FIG. 7 shows an illustrative embodiment of hierarchy of nodes 62, in which each node 66A-H includes attribute information for the corresponding window 64A-H (FIG. 1) as well as a pointer to a parent node, a previous sibling node, a next sibling node, and a child node to implement a hierarchical structure. The use of pointers allows for efficient navigation and management of hierarchy of nodes 62, including reordering, inserting, and deleting nodes, as is well known in the art. The use of and setting of pointers for managing data is well known in the art, and therefore is not discussed further herein. It is understood that additional or fewer pointers can be used as well as any alternative method of managing data with or without pointers.

Nodes 66A-H are initially placed in hierarchy of nodes 62 based on hierarchical relationship data. Referring to FIGS. 1, 6, and 7 together, since window 64A does not have a parent window, its corresponding node, node 66A, is placed at the top of hierarchy of nodes 62. Nodes 66B-D for child windows 64B-D of window 64A are placed one level below node 66A, nodes 66E-G for child windows 64E-G of window 64B are placed one level below node 66B, and node 66H for child window 64H of window 64D is placed one level below node 66D. In this embodiment, a set of sibling nodes (i.e., the set of nodes for a set of sibling windows) are further placed in hierarchy of nodes 62 according to stacking order data for the set of sibling windows. The set of sibling nodes are configured so that the highest node in the stacking order is placed first, with the remaining sibling nodes following in descending order. Consequently, for windows 64B-D, node 66B is placed first, followed by node 66C, and then node 66D. Similarly, for windows 64E-G, node 66E is placed first, followed by node 66F, and then node 66G.

Once created, hierarchy of nodes 62 and the attribute information in individual nodes 66A-H can quickly bercome outdated. Consequently, steps S4 and S5 are included in FIG. 4. In step S4, various window event types are monitored by monitor system 48 (FIG. 3). In step S5, the hierarchy of nodes is updated based on an occurrence of one of the monitored window event types by manager system 46 (FIG. 3). For example, referring to FIG. 1, a user may select window 64H, thereby moving its parent window 64D to the front of the stacking order within the set of siblings 64B-D. Further, one or more windows can be created, destroyed, moved, resized, etc. In general, windows display systems generate window events when one or more of these actions occur. Consequently, occurrences of these events can be asynchronously monitored, and hierarchy of nodes 62 and/or the attribute information in one or more nodes 66A-H can be updated based on the occurrence of a monitored window event.

Steps S6 and S7 of FIG. 4 are shown occurring in parallel with steps S4 and S5. In step S6, display data is obtained by retrieval system 50 (FIG. 2). In step S7, the display data is mapped into the shared format using the hierarchy of nodes by conversion system 52 (FIG. 2). Each set of steps S4-S5 and S6-S7 are repeated until it is determined in steps S8 and S9, respectively, that mapping the display data is no longer desired. While shown in parallel, it is understood that steps S4-S5 and S6-S7 can be implemented in parallel, series, or some combination.

With reference to step S6 and FIGS. 1, 6, and 7 collectively, use of hierarchy of nodes 62 allows display data obtained for an ancestor window to be used in mapping one or more child windows, grandchild windows, etc. To obtain display data, the display data for the display area defined by the top-level window (i.e., window 64A in FIG. 1) is copied from a display memory. Since each window is located within the display area of its parent window, the display data for some or all of the child windows, grandchild windows, etc. (i.e., windows 64B-H) may also be obtained.

When implemented in an X Windows System, display data for node(s) that share a common depth with an ancestor node and each intervening ancestor node can be obtained in a single operation that acquires the display data for the ancestor node. For example, FIG. 6 shows nodes 66A, 66B, 66E having eight bit PseudoColor (PC) pixel data, nodes 66C, 66H having twenty-four bit PC pixel data, nodes 66D, 66G having twenty-four bit TrueColor (TC) pixel data, and node 66F having eight bit TC pixel data. As long as the depth of the pixel data is the same, the display data for multiple nodes can be obtained in one operation regardless of the visual being used. As a result, when display data for node 66A is obtained, the display data for nodes 66B, 66E, and 66F are also obtained. The display data for node 66F can be obtained even though node 66F uses TC pixel data while its ancestor nodes 66A, 66B use PC pixel data.

However, in an X Windows System, when a window or an intervening ancestor window uses a different depth than the ancestor window, the display data for the window is undefined when the display data for its ancestor window is retrieved. In this case, multiple operations are required to obtain the display data for all nodes 66A-H. For example, node 66G uses pixel data having twenty-four bits. Consequently, a separate operation is required to obtain its pixel data. Similarly, nodes 66C, 66D also use pixel data having twenty-four bits. Each node 66C, 66D requires an additional operation to obtain its display data since neither node 66C, 66D is an ancestor of the other. However, when the display data for node 66D is obtained, the display data for node 66H is also obtained since it uses the same depth.

Figure 5:
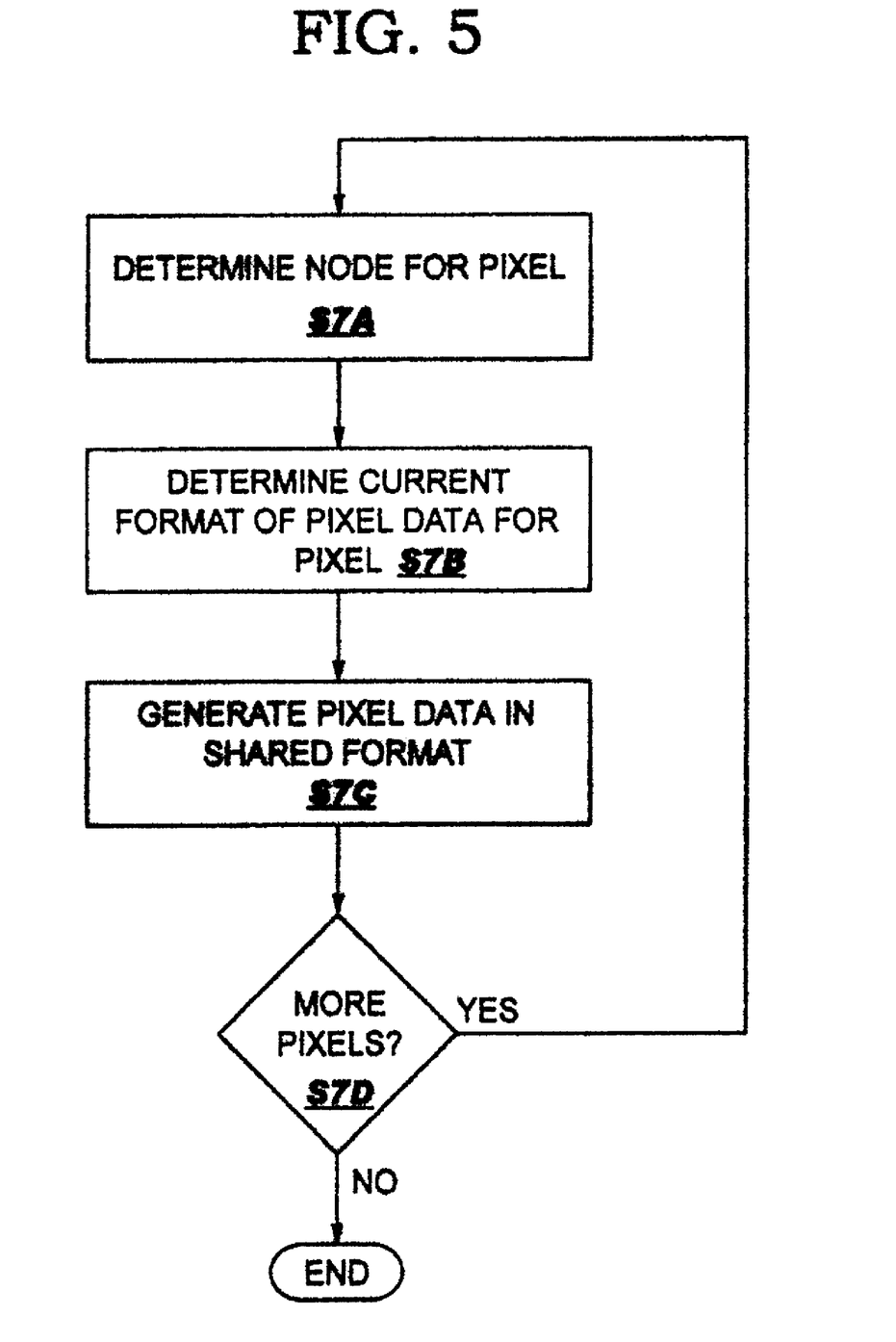
FIG. 5 shows one embodiment of the mapping step of FIG. 4.

Once display data has been obtained, step S7 (FIG. 4) maps the pixel data within the display data from its current format to a shared format. FIG. 5 shows an illustrative embodiment of the mapping step, in which step 57A determines the node corresponding to each pixel, step 57B determines the current format of the pixel data for the pixel using the node, and step 57C generates pixel data in the shared format from the pixel data in its current format. Step 57D repeats these steps for each pixel in the display data. Generating hierarchy of nodes 62 (FIGS. 6 & 7) with nodes 66A-H and storing attribute information for the corresponding window 64A-H in each node 66A-H allows the correct node to be efficiently located in step 57A. To locate the appropriate node, hierarchy of nodes 62 is traversed in a prefix order. That is, the first node that contains a pixel, and for which the pixel is not within any of its child, grandchild, etc. nodes, is the correct node to use in mapping the pixel data for the pixel.

Pixel 68 in FIG. 1 provides an illustrative example of steps S6 and S7 (FIG. 4). Pixel 68 is within the area defined by each window 64A-H, however window 64E currently owns pixel 68. Therefore, mapping pixel data for pixel 68 from one format to a shared format requires using the attribute information in node 66E. To determine that node 66E corresponds to pixel 68, the node at the top level of the hierarchy is initially consulted. The attribute information in node 66A is used to determine if pixel 68 is within the area of window 64A. Since it is, node 66B, the first child of node 66A, is consulted next. Since pixel 68 is within the area of window 64B, node 66E, the first child of node 66B is consulted. It is then determined that pixel 68 is within the area of window 64E, and node 66E does not have any children. Therefore, node 66E is the node that is associated with pixel 68.

Now that pixel data and its corresponding node are available, the current format of the pixel data is determined using the attribute information of the node (step 57B of FIG. 5), and pixel data in the shared format is generated (step 57C of FIG. 5). In one embodiment, the depth, visual, and/or color map information in the node are used to map the pixel data into the shared format. The shared format can comprise, for example, a twenty-four bit TrueColor format that can be readily translated by other applications and/or systems. In this case, when the pixel data includes the RGB values in the data itself, mapping the data may comprise shifting the pixel data so that each RGB value is represented by eight bits. For pixel data that uses indexing, the pixel data may be used to look up the RGB values in the color map, and the RGB values are subsequently shifted so that each value has eight bits.

To further enhance the speed with which an appropriate node is located, the display area can be divided into a plurality of sections. For example, FIG. 1 shows display area 60 divided into a two-dimensional grid with each section 70A-C being a set number of pixels wide and long. In one embodiment, each section 70A-C is a square block of pixels having a size that is a power of two, e.g., sixty-four pixels wide by sixty-four pixels long. Each section 70A-C can be assigned an address (i.e., x, y coordinates) similar to the pixels in the display. Use of a length and width that are powers of two allows the address of the section in which a pixel is located to be quickly determined by right shifting the values representing the pixel location. It is understood however, that any size or shape for sections 70A-C can be used.

Referring to FIGS. 1, and 6-8 together, using hierarchy of nodes 62 and sections 70A-C, a list of nodes 76A-C can be created for each section 70A-C. Each list of nodes 76A-C includes the node for each window currently visible within the section 70A-C. In one embodiment, a two-dimensional array 74 is created in which each array element 72A-C is associated with a unique section 70A-C. Each array element 72A-C has a list of nodes 76A-C for its section 70A-C. Each list of nodes 76A-C includes each node that owns at least one pixel within the section 70A-C for the element 72A-C. For example, list of nodes 76A for element 72A includes each node that is visible within section 70A. Each list of nodes 76A-C is ordered so that the node corresponding to the topmost window within its section 70A-C is located at the start of list of nodes 76A-C, with the remaining nodes located in descending order. Alternatively, a node corresponding to the window that currently owns the most pixels within its section 70A-C can be located at the start of each list of nodes 76A-C.

Figure 8:
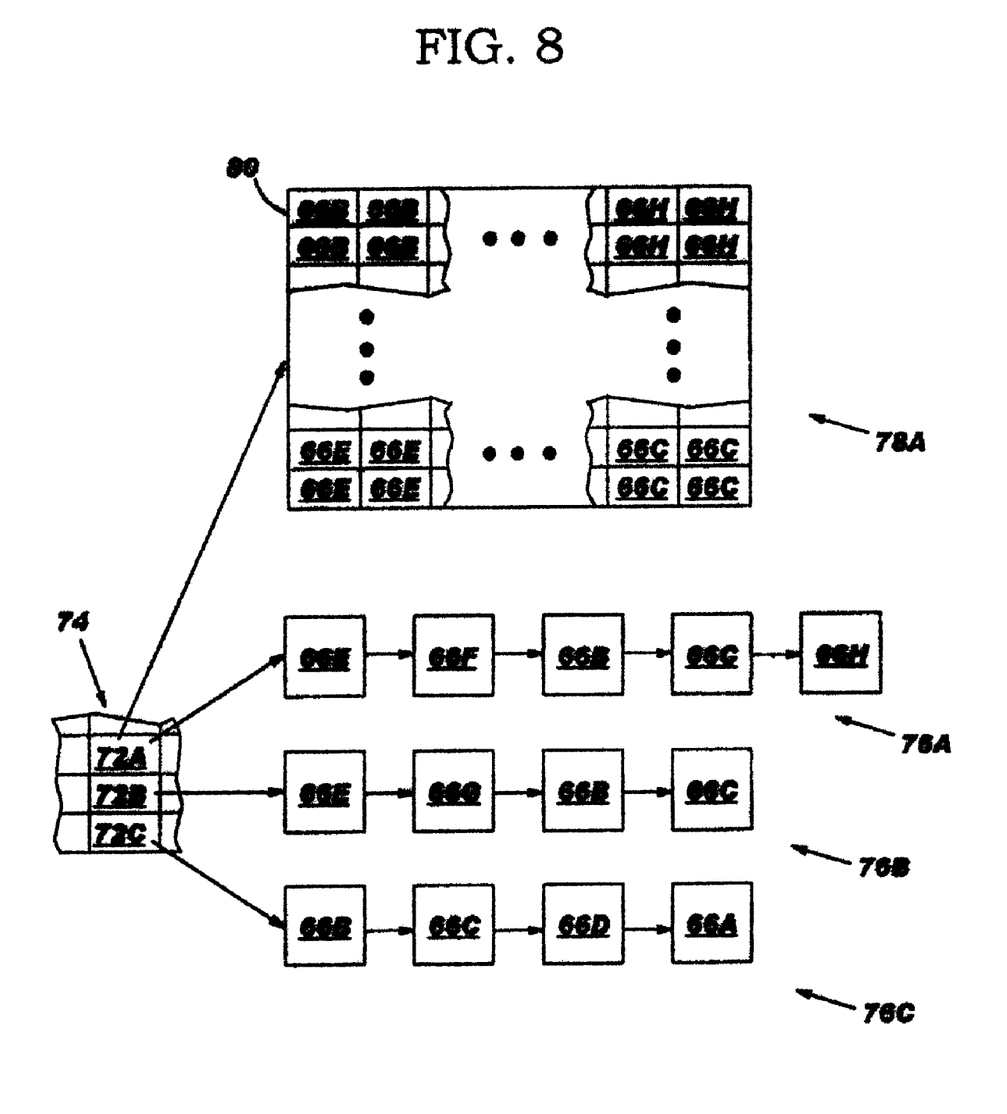
FIG. 8 shows a schematic representation of one embodiment of a plurality of lists of nodes and two dimensional arrays.

While additional data maintenance is required for lists of nodes 76A-C, they reduce the average number of nodes that must be searched to determine the appropriate node for a given pixel. For example, section 70B is one section of display area 60. Windows 64B, 64C, 64E, and 64G own at least a portion of the display area within section 70. Consequently, array element 72B has list of nodes 76B that includes nodes 66B, 66C, 66E, and 66G. As discussed above, list of nodes 76B is ordered so that the node at the top of the stacking order is located first. In this case, node 66E is the first node, followed by node 66G, node 66B, and then node 66C. To locate the node corresponding to pixel 68, it is determined that pixel 68 is located within section 70B. Using list of nodes 76B for element 72B, it is determined that node 66E is the appropriate node after consulting only a single node.

The use of sections 70A-C and lists of nodes 76A-C readily allow display data to be obtained section by section rather than by windows. When obtained section by section, the attribute information of each node 66A-H can further include data identifying a highest ancestor node. The highest ancestor node corresponds to the furthest ancestor window for which display data for the window corresponding to the node can be obtained using a single operation. As discussed above, in X Windows, when display data for a window is stored using a different depth than its parent window, two operations are required to obtain the display data for each window. As a result, node 66A would be the highest ancestor node for nodes 66A, 66B, 66E, 66F, nodes 66C, 66D, 66G would have themselves as their highest ancestor nodes, and node 66H would have node 66D as its highest ancestor node. Inclusion of the highest ancestor node allows the benefit of hierarchy of nodes 62 to be readily exploited on a section by section basis. For example, when obtaining display data for section 70A, list of nodes 76A is consulted. Node 66E is the first node and has a highest ancestor of node 66A. Consequently, display data is obtained for the portion of window 64A that is within section 70A. The display data obtained is used to map the display data for windows 64E, 64F, and 64B. A second operation is required to retrieve display data for window 64C, and a third operation is required to retrieve display data for window 64H since these windows use a different depth than window 64A.

The efficiency of mapping display data can be further increased by including a second two-dimensional array 78A for each array element 72A-C. Array 78A includes an array element 80 for each pixel located within the corresponding section 70A. Each array element 80 includes an identifier that identifies the node corresponding to the window that owns the pixel. When a window that is not shared is displayed within a section 70A-C, the elements 80 in array 78A that correspond to the pixels owned by the window can be marked as invalid. Use of arrays 78A assures that the corresponding node for any pixel in the shared display area can be found in a single operation.

Lists of nodes 76A-C and/or arrays 78A for sections 70A-C can be updated along with hierarchy of nodes 62 when the occurrence of a monitored window event is detected that effects one or more of lists of nodes 76A-C and/or arrays 78A. In one embodiment, the monitored window events are queued until updating the shared display data is to restart, at which time hierarchy of nodes 62, lists of nodes 76A-C, and arrays 78A are updated based on all the queued window events, if necessary. Lists of nodes 76A-C and arrays 78A can be implemented using any method now known or later developed. For example, each list of nodes 76A-C can comprise a linked list of pointer to the corresponding node stored in memory, and each array 78A can comprise a two-dimensional array having elements that contain a pointer to the corresponding node stored in memory for each pixel, as are well known in the art.

While the discussion is limited to nodes created for each window in the display area to be mapped, it is understood that a node can be created and managed for all windows in a display, regardless of whether they are located within the display area to be mapped. Further, while the method is described with reference to pixel data, it is understood that the teachings of the invention apply to any type of display data. Still further, it is understood that a node can be created for the desktop (i.e., background) of the display to obtain display data for portions of the display not covered by any window.

IV. Miscellaneous

It is understood that the invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, controls source computer 12 (FIG. 2) and/or destination computer 16 such that they carry out the respective methods described herein. Alternatively, a specific use computer, containing specialized hardware for carrying out one or more of the functional tasks of the invention, could be utilized. The invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form. While the various methods have been described as occurring in a particular sequence, it is understood that independent steps can be performed simultaneously or in a different order than that described herein. Further, while various systems have been depicted and discussed as implementing various functions, it is understood that fewer and/or additional systems can be used to implement the various functions described herein.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

The invention claimed is:

1. A method of mapping display data for a display area including at least one window, the method comprising:
creating a node for each window, each node including hierarchical relationship data and format data for the display data for the window;
generating a hierarchy of nodes based on the hierarchical relationship data;
dividing the display area into a plurality of sections, each section including an area within the display area that is defined independently of the at least one window;
creating a list of nodes for each section using the hierarchy of nodes, wherein the node for each window displayed in at least a portion of the section is included in the list of nodes;
storing the list of nodes; and
mapping the display data from a first format to a shared format using the hierarchy of nodes, wherein the mapping is based on the display data and the format data for a node corresponding to the display data.

2. The method of claim 1, further comprising:
monitoring an occurrence of a window event; and
updating the hierarchy of nodes based on the occurrence of the window event.

3. The method of claim 2, further comprising updating the hierarchical relationship data based on the occurrence of the window event.

4. The method of claim 1, wherein a set of sibling nodes for a set of sibling windows are located in the hierarchy of nodes based on a stacking order of the sibling windows.

5. The method of claim 1, further comprising creating an array having an element for each section, wherein each element includes the list of nodes for the corresponding section.

6. The method of claim 1, further comprising:
monitoring an occurrence of a window event; and
updating at least one of the lists of nodes based on the occurrence of the window event.

7. The method of claim 1, further comprising obtaining display data for a plurality of windows having a first pixel depth in a single operation.

8. The method of claim 7, further comprising repeating the obtaining and mapping steps for at least one window having a second pixel depth.

9. The method of claim 1, wherein the mapping step includes:
determining the node corresponding to each pixel in the display data;
determining a first format of pixel data for each pixel using the node; and
generating pixel data in the shared format for each pixel from the pixel data in the first format.

10. The method of claim 1, further comprising sharing the mapped display data with a destination computer.

11. A system for sharing display data for a shared display area including at least one window, the system comprising:
means for creating a node for each window, each node including hierarchical relationship data and format data for the display data for the window;
means for managing a hierarchy of nodes that includes each node using the hierarchical relationship data;
means for dividing the display area into a plurality of sections, each section including an area within the display area that is defined independently of the at least one window;
means for creating a list of nodes for each section using the hierarchy of nodes wherein the node for each window displayed in at least a portion of the section is included in the list of nodes;
means for storing the list of nodes; and
means for mapping the display data from a first format to a shared format using the hierarchy of nodes and the list of nodes for each section, wherein the mapping is based on the display data and the format data for a node corresponding to the display data.

12. The system of claim 11, further comprising:
means for sharing the mapped display data with a destination computer;
means for displaying the mapped display data at the destination computer; and
means for altering the shared display area using the destination computer.

13. A system for mapping display data for a shared display area including at least one window, the system comprising:
means for creating a node for each window, each node including hierarchical relationship data and format data for the display data for the window;
means for managing a hierarchy of nodes that includes each node using the hierarchical relationship data;

means for creating a plurality of lists of nodes, wherein each list of nodes includes a node for each window displayed in at least a portion of one of a plurality of sections of the shared display area;
means for storing the list of nodes; and
means for mapping pixel data in the display data to a shared format using the hierarchy of nodes, wherein the mapping is based on the pixel data and the format data for a node corresponding to the pixel data.

14. The system of claim 13, further comprising means for monitoring an occurrence of a window event.

15. The system of claim 13, wherein the means for mapping includes:
means for determining the node corresponding to each pixel in the display data;
means for determining a first format of the display data for each pixel using the node; and
means for generating display data in the shared format for each pixel from the display data in the first format.

16. A computer program product comprising a computer useable medium having computer readable program code embodied therein for mapping display data for a display area including at least one window, the program product comprising:
program code configured to create a node for each window, the node including hierarchical relationship data for the window and attribute information and format data for the display data for the window;
program code configured to manage a hierarchy of nodes that includes each node using the hierarchical relationship data;
program code configured to create a plurality of lists of nodes, wherein each list of nodes includes the node for each window displayed in at least a portion of a unique one of a plurality of sections of the shared display area;
program code configured to store the list of nodes in a computer usable medium; and
program code configured to map the display data from a first format to a shared format using the hierarchy of nodes, wherein the mapping is based on the display data and the format data for a node corresponding to the display data.

17. The program product of claim 16, further comprising:
program code configured to monitor an occurrence of a window event; and
program code configured to update at least one of: the attribute information and the hierarchy of nodes based on the occurrence of the window event.

18. The program product of claim 16, wherein the display data is mapped at a source system, the program product further comprising:
program code configured to display the display data at a destination system; and
program code configured to alter the display data using the destination system.

19. A computer-readable storage medium having stored therein instructions for performing a method for mapping display data for a display area including at least one window, the method comprising the steps of:
creating a node for each window, each node including hierarchical relationship data and format data for the display data for the window;
generating a hierarchy of nodes based on the hierarchical relationship data;
obtaining the display data from a display memory using the hierarchy of nodes;
dividing the display area into a plurality of sections, each section including an area within the display area that is defined independently of the at least one window;
creating a list of nodes for each section using the hierarchy of nodes, wherein the node for each window displayed in at least a portion of the section is included in the list of nodes;
storing the list of nodes in a computer usable medium; and
mapping the display data from a first format to a shared format using the hierarchy of nodes, wherein the mapping is based on the display data and the format data for a node corresponding to the display data.

* * * * *